Patented Feb. 13, 1934

1,947,433

UNITED STATES PATENT OFFICE

1,947,433

MANUFACTURE OF SOLUBLE COMPOSITIONS AND THEIR USE IN DYEING AND PRINTING

Mordecai Mendoza, West Didsbury, Arthur George Murray, Whitefield, and Herbert Bradley Briggs, South Reddish, England, assignors to Imperial Chemical Industries Limited, a corporation of Great Britain No Drawing. Application March 19, 1932, Serial No. 600,072, and in Great Britain March 11, 1931

11 Claims. (Cl. 8—6)

This invention relates to the manufacture of dyestuffs and more particularly refers to a water-soluble or alkali-soluble dyestuff.

The object of this invention is to produce a dyestuff in the solid phase which may readily enter solution in water or alkali. A further object is to produce a dyestuff which is especially valuable for printing fabrics. Further objects are to produce dyestuffs or printing pastes which are stabilized on the material to be dyed or printed by treatment with an acidic substance, either in the liquid or vapor phase. Additional objects will appear hereinafter.

These objects are attained by mixing together in the dry state and in approximately stoichiometric proportions, a salt of an aldehyde-bisulfite compound of an arylamine, an alkali nitrite, and a coupling component such as an arylamide of a hydroxy naphthoic acid, adapted to give insoluble dyestuffs, coupled on the material to be dyed or printed. As illustrative of an alkali salt of an aldehyde-bisulfite compound of an arylamine, we may take a compound of the general formula: $R.NH.CH_2.SO_3X$ wherein R represents an aryl radical (devoid of acid groups such as $C_6H_5$, $Cl.C_6H_4$, $CH_3O.C_6H_4$, $C_{10}H_7$, $C_6H_5.N:N.C_6H_4$); and X represents an atom of a metal. For a further understanding of these compounds reference may be made to British Patent No. 197,809, and Raschig, Schwefel and Stickstoff-studien, Leipzig and Berlin 1924 p. 242 etc.

It is to be understood wherever "arylamine" is mentioned in this application, we do not confine ourselves to those substances where hydrogen alone is attached to the aromatic nucleus but mean also to include those substances where methyl, halogen, methoxy, hydroxy, or similar groups are attached to the nucleus in place of one or more hydrogen atoms.

The invention may be more readily understood by a consideration of the following examples:

Example I

Twenty-five and eight-tenth (25.8) parts by weight of the compound obtained by the interaction of formaldehyde, sodium bisulfite, and 5-chloro-ortho-toluidine are intimately mixed, in the dry state, with 7 parts of sodium nitrite and 30 parts of the ortho-anisidide of 2:3-hydroxynaphthoic acid. This composition may be used for dyeing or printing.

If a printing paste is desired, 6 parts of the above composition is mixed with 2.5 parts of turkey red oil (50%), 12 parts of ethylene glycol, and 10 parts of water. The mixture is heated and to it is added 2.5 parts of caustic soda (76° Twad.) and 59 parts of wheat starch-tragacanth thickening. The printing paste so obtained is printed on the fabric in the usual manner. The printed fabric is then exposed to the hot vapor of acetic acid for about 10 minutes. The fabric is then soaped at the boil for 2 minutes in the usual way. An excellent fast red shade is thereby produced.

Example II

In place of the compound obtained by the interaction of formaldehyde, sodium bisulfite, and 5-chloro-ortho-toluidine, we may use the compound obtained by the interaction of formaldehyde, sodium bisulfite, and either aniline, ortho-anisidine, or 4-chloro-ortho-toluidine. For the ortho-anisidide of 2:3-hydroxy napthoic acid we may substitute the anilide, ortho-toluidide, para-chloro-anilide, or the 4-bromo-ortho-anilide, with equally satisfactory results. Where water soluble compositions are required the alkali salts of the coupling components may be used.

The product produced by the process of this invention is readily soluble in water or alkali and gives a dye or paste which when applied to fiber or other material is remarkably fast to sunlight and washing. It is extremely stable and does not decrease in strength to any noticeable extent when stored for considerable periods of time. When the dye or printing paste is impregnated on the fiber or other material, it is readily fixed by treatment with an acid or acidic substance in the liquid or vapor phase.

As many apparent and widely different embodiments of this invention may be made without departing from the spirit thereof, it is to be understood that we do not limit ourselves to the foregoing examples or description except as indicated in the following claims.

We claim:

1. A composition for use in dyeing and printing, comprising a salt of the formaldehyde-bisulfite compound of a primary arylamine free from azo groups, an alkali nitrite, and an arylamide of 2:3-hydroxy-naphthoic acid, all in approximately stoichiometric proportions.

2. A process wherein a salt of the formaldehyde-bisulfite compound of a primary arylamine free from azo groups, an alkali nitrite and an arylamide of 2:3-hydroxy-naphthoic acid, all in approximately s'oichiometric proportions, are dissolved in a suitable medium, applied to the cotton or rayon material to be treated, and treated with an acidic substance.

3. A process wherein about 25.8 parts by weight of the compound obtained by the interaction of formaldehyde, sodium bisulfite and 5-chloro-ortho-toluidine are intimately mixed, in the dry state, with about 7 parts of sodium nitrite and about 30 parts of the ortho-anisidide of 2:3-hydroxy-naphthoic acid, this mixture is dissolved in a suitable medium and the material to be dyed impregnated therewith, the color being developed on the impregnated material by treatment with the hot vapors of acetic acid.

4. A process wherein about 25.8 parts by weight of the compound obtained by the interaction of formaldehyde, sodium bisulfite and 5-chloro-ortho-toluidine are intimately mixed, in the dry state, with about 7 parts of sodium nitrite and about 30 parts of the ortho-anisidide of 2:3-hydroxy-naphthoic acid, about 6 parts of this mixture are added to a solution comprising about 2.5 parts of Turkey red oil (50%), about 12 parts of ethylene glycol, and about 10 parts of water, the resulting solution is heated and to it is added about 2.5 parts of caustic soda (46° Twad.) and about 59 parts of wheat starch-tragacanth thickening, the paste produced thereby is printed on the material in the customary manner, and the printed material exposed to the hot vapors of acetic acid for about 10 minutes, the material is then soaped and boiled for about 2 minutes in the usual way.

5. A composition for use in dyeing and printing, comprising a formaldehyde-bisulfite compound of a primary arylamine free from azo groups, an alkali nitrite, and an arylamide of 2-3-hydroxy-naphthoic acid.

6. A composition for use in dyeing and printing, comprising a formaldehyde-bisulfite compound of a primary arylamine selected from the group consisting of 5-chloro-o-toluidine, aniline, ortho-anisidine, and 4-chloro-o-toluidine, an alkali nitrite, and an arylamide of 2-3-hydroxy-naphthoic acid, the arylamide being selected from the group consisting of the ortho-anisidide, the ortho-toluidide, the anilide, the para-chloro-anilide, and the para-bromo-anilide.

7. A process wherein the composition of claim 5 is applied to the cotton or rayon material to be printed as a paste, and the material then subjected to treatment with an acid.

8. A process wherein the composition of claim 5 is applied to the cotton or rayon material to be printed as a paste, and the material then subjected to treatment with an acid.

9. A process wherein the composition of claim 5 is applied to the cotton or rayon material to be printed as a paste, and the material then subjected to treatment with an acid.

10. A printing paste among the constituents of which are the following: an alkali nitrite, an arylamide of 2:3-hydroxy-naphthoic acid and a compound having the general formula: $R \cdot NH \cdot CH_2 \cdot SO_3 \cdot X$ wherein R is a phenyl group which may have substituted thereon halogen, alkyl, and alkoxy groups, and X is a metal.

11. The process wherein the printing paste defined in claim 10 is applied to rayon, and the impregnated material treated with acetic acid.

MORDECAI MENDOZA.
ARTHUR GEORGE MURRAY.
HERBERT BRADLEY BRIGGS.

CERTIFICATE OF CORRECTION.

Patent No. 1,947,433.     February 13, 1934.

MORDECAI MENDOZA, ET AL.

It is hereby certified that error appears in the printed specification of the above numbered patent requiring correction as follows: Page 2, line 91, claim 8, for the numeral "5" read 6; same page, line 95, claim 9, for the numeral "5" read 1; and that the said Letters Patent should be read with these corrections therein that the same may conform to the record of the case in the Patent Office.

Signed and sealed this 20th day of March, A. D. 1934.

F. M. Hopkins

Acting Commissioner of Patents.

(Seal)

cotton or rayon material to be treated, and treated with an acidic substance.

3. A process wherein about 25.8 parts by weight of the compound obtained by the interaction of formaldehyde, sodium bisulfite and 5-chloro-ortho-toluidine are intimately mixed, in the dry state, with about 7 parts of sodum nitrite and about 30 parts of the ortho-anisidide of 2:3-hydroxy-naphthoic acid, this mixture is dissolved in a suitable medium and the material to be dyed impregnated therewith, the color being developed on the impregnated material by treatment with the hot vapors of acetic acid.

4. A process wherein about 25.8 parts by weight of the compound obtained by the interaction of formaldehyde, sodium bisulfite and 5-chloro-ortho-toluidine are intimately mixed, in the dry state, with about 7 parts of sodium nitrite and about 30 parts of the ortho-anisidide of 2:3-hydroxy-naphthoic acid, about 6 parts of this mixture are added to a solution comprising about 2.5 parts of Turkey red oil (50%), about 12 parts of ethylene glycol, and about 10 parts of water, the resulting solution is heated and to it is added about 2.5 parts of caustic soda (46° Twad.) and about 59 parts of wheat starch-tragacanth thickening, the paste produced thereby is printed on the material in the customary manner, and the printed material exposed to the hot vapors of acetic acid for about 10 minutes, the material is then soaped and boiled for about 2 minutes in the usual way.

5. A composition for use in dyeing and printing, comprising a formaldehyde-bisulfite compound of a primary arylamine free from azo groups, an alkali nitrite, and an arylamide of 2-3-hydroxy-naphthoic acid.

6. A composition for use in dyeing and printing, comprising a formaldehyde-bisulfite compound of a primary arylamine selected from the group consisting of 5-chloro-o-toluidine, aniline, ortho-anisidine, and 4-chloro-o-toluidine, an alkali nitrite, and an arylamide of 2-3-hydroxy-naphthoic acid, the arylamide being selected from the group consisting of the ortho-anisidide, the ortho-toluidide, the anilide, the para-chloro-anilide, and the para-bromo-anilide.

7. A process wherein the composition of claim 5 is applied to the cotton or rayon material to be printed as a paste, and the material then subjected to treatment with an acid.

8. A process wherein the composition of claim 5 is applied to the cotton or rayon material to be printed as a paste, and the material then subjected to treatment with an acid.

9. A process wherein the composition of claim 5 is applied to the cotton or rayon material to be printed as a paste, and the material then subjected to treatment with an acid.

10. A printing paste among the constituents of which are the following: an alkali nitrite, an arylamide of 2:3-hydroxy-naphthoic acid and a compound having the general formula: $R \cdot NH \cdot CH_2 \cdot SO_3 \cdot X$ wherein R is a phenyl group which may have substituted thereon halogen, alkyl, and alkoxy groups, and X is a metal.

11. The process wherein the printing paste defined in claim 10 is applied to rayon, and the impregnated material treated with acetic acid.

MORDECAI MENDOZA.
ARTHUR GEORGE MURRAY.
HERBERT BRADLEY BRIGGS.

CERTIFICATE OF CORRECTION.

Patent No. 1,947,433.  February 13, 1934.

MORDECAI MENDOZA, ET AL.

It is hereby certified that error appears in the printed specification of the above numbered patent requiring correction as follows: Page 2, line 91, claim 8, for the numeral "5" read 6; same page, line 95, claim 9, for the numeral "5" read 1; and that the said Letters Patent should be read with these corrections therein that the same may conform to the record of the case in the Patent Office.

Signed and sealed this 20th day of March, A. D. 1934.

F. M. Hopkins

Acting Commissioner of Patents.

(Seal)